(12) United States Patent
Rowe et al.

(10) Patent No.: US 7,528,763 B2
(45) Date of Patent: May 5, 2009

(54) MILLIMETER-WAVE INTERROGATION RELATING FEATURES

(75) Inventors: Richard L. Rowe, Saratoga, CA (US); Thomas W. Grudkowski, Pleasanton, CA (US)

(73) Assignee: SafeView, Inc., Los Gatos, CA (US)

(*) Notice: Subject to any disclaimer, the term of this patent is extended or adjusted under 35 U.S.C. 154(b) by 227 days.

(21) Appl. No.: 11/465,401

(22) Filed: Aug. 17, 2006

(65) Prior Publication Data

US 2006/0279451 A1   Dec. 14, 2006

Related U.S. Application Data

(62) Division of application No. 10/825,536, filed on Apr. 14, 2004, now abandoned.

(51) Int. Cl.
*G01S 13/00*   (2006.01)
(52) U.S. Cl. .................... 342/22; 342/179; 342/180
(58) Field of Classification Search .............. 342/22, 342/27, 58, 60, 179, 180, 191
See application file for complete search history.

(56) References Cited

U.S. PATENT DOCUMENTS

| | | | |
|---|---|---|---|
| 4,866,424 A | 9/1989 | Parks | |
| 4,901,084 A | 2/1990 | Huguenin et al. | |
| 4,910,523 A | 3/1990 | Huguenin et al. | |
| 4,940,986 A | 7/1990 | Huguenin | |
| 5,047,783 A | 9/1991 | Hugenin | |
| 5,073,782 A | 12/1991 | Huguenin et al. | |
| 5,170,169 A | 12/1992 | Stephan | |
| 5,202,692 A | 4/1993 | Huguenin et al. | |
| 5,227,800 A | 7/1993 | Huguenin et al. | |
| 5,367,552 A | 11/1994 | Peschmann | |
| 5,455,590 A | 10/1995 | Collins et al. | |
| 5,557,283 A | 9/1996 | Sheen et al. | |
| 5,600,303 A | 2/1997 | Husseiny et al. | |
| 5,760,397 A | 6/1998 | Huguenin et al. | |
| 5,859,609 A | 1/1999 | Sheen et al. | |
| 6,057,761 A | 5/2000 | Yukl | |
| 6,078,047 A | 6/2000 | Mittleman et al. | |

(Continued)

OTHER PUBLICATIONS

"The Dielectric People Portal II," Spatial Guardian, Inc., www.spatialguardian.com/products/people_portal/index.shtml.

(Continued)

*Primary Examiner*—Isam Alsomiri
(74) *Attorney, Agent, or Firm*—Kolisch Hartwell, PC (57) ABSTRACT

Methods for interrogating a subject with millimeter-wave electromagnetic radiation, and generating data representative of a selected feature of a subject may include serial comparative interrogating for processing. Serial processing may include first interrogating a given subject at a first time, generating a data set from the first interrogating, second interrogating the subject at a second time different than the first time, generating a data set from the second interrogating, and identifying information corresponding to a given feature of the subject from each data set. Non-serial processing may include interrogating a subject, generating a data set from the interrogating, identifying information corresponding to a first feature of the subject, and identifying information corresponding to a second feature of the subject. Processing may also include comparing the information identified, and/or rendering representations of the information identified and presenting the representations rendered.

16 Claims, 5 Drawing Sheets

U.S. PATENT DOCUMENTS

| | | |
|---|---|---|
| 6,088,423 A | 7/2000 | Krug et al. |
| 6,094,472 A | 7/2000 | Smith |
| 6,342,696 B1 | 1/2002 | Chadwick |
| 6,469,624 B1 | 10/2002 | Whan |
| 6,507,309 B2 | 1/2003 | McMakin et al. |
| 6,518,915 B2 | 2/2003 | Schutz et al. |
| 6,665,373 B1 | 12/2003 | Kotowski et al. |
| 6,703,964 B2 | 3/2004 | McMakin |
| 6,791,487 B1 | 9/2004 | Singh et al. |
| 6,876,322 B2 | 4/2005 | Keller |
| 2004/0090359 A1 | 5/2004 | McMakin |
| 2004/0140924 A1 | 7/2004 | Keller |
| 2005/0093858 A1* | 5/2005 | Tsai et al. ............ 345/419 |

OTHER PUBLICATIONS

"Transportation Security What Works," Spatial Guardian, Inc., www.spatialguardian.com/news_transec_1102.shtml, Nov. 2002.

Laws, Kenneth I., "Goal-Directed Texture-Image Segmentation," SPIE, vol. 548 Applications of Artificial Intelligennce II, pp. 19-26, 1985.

Laws, Kenneth I., "Rapid Texture Identification," SPIE, vol. 238 Image Processing for Missile Guidance, pp. 19-26, 1985.

* cited by examiner

MILLIMETER-WAVE INTERROGATION RELATING FEATURES

RELATED APPLICATIONS

This is a division of application Ser. No. 10/825,536, filed Apr. 14, 2004, which application is incorporated herein by reference in its entirety for all purposes.

BACKGROUND

Millimeter wave signals are used for radar and telecommunications. They are also capable of being used to generate data representative of a subject, by directing millimeter-wave signals at the subject and detecting the reflected signal. The data generated may then be used to produce an image of the subject. Examples of such imaging systems are described in U.S. Pat. Nos. 5,455,590; 5,557,283; 5,859,609; 6,507,309; 6,703,964; 6,876,322; 7,365,672; and 7,405,692, which patent references are incorporated herein by reference.

SUMMARY OF THE DISCLOSURE

An interrogation system can include an interrogating apparatus configured to interrogate a subject with millimeter-wave electromagnetic radiation. A subject may include one or more persons, animals, and inanimate objects, or combinations or portions thereof. Such a system can also include a controller coupled to the interrogating apparatus configured to generate and process data representative of a subject, or a portion or portions thereof, such as one or more selected features of the subject.

Subject interrogating methods may include serial interrogating, which may include one or more of first interrogating a given subject at a first time, generating a data set from the first interrogating, second interrogating the subject at a second time different than the first time, generating a data set from the second interrogating, and identifying information corresponding to a given feature of the subject from each data set. Alternatively or additionally, subject interrogating methods may include non-serial interrogating, which may include one or more of interrogating a given subject, generating a data set from the interrogating, identifying information corresponding to a first feature of the subject, and identifying information corresponding to a second feature of the subject. Such methods may also include comparing the information identified, rendering representations of the information identified, and/or presenting the representations rendered.

DETAILED DESCRIPTION OF VARIOUS EMBODIMENTS

There are situations in which it is desirable to identify features of a subject, such as a given feature at different times and/or different features at a given time. For example, when monitoring or assessing the effects of a physical development program on subjects such as persons or animals, the precision and accuracy of monitoring such effects over time may be benefited by employing millimeter-wave imaging technology. This may be particularly true in applications in which accurate topographical, cross-sectional, and/or other surface measurement data of the subject's body, or a portion or portions thereof, are crucial in monitoring effects of a physical development program such as weight loss, physical rehabilitation, bodybuilding, or the like, or of physical modification such as cosmetic surgery. Similarly, in assessing a subject's physical and/or medical condition, an assessment or diagnosis may be rendered more effective by using millimeter-wave technology, for example, in applications in which comparison of different and/or opposing body parts is desired. Further, use of millimeter-wave technology may be helpful in assessing the condition of a body surface covered by clothing, bandages, a cast, or the like, without first having to remove the covering. Regardless of the application, a person subjected to monitoring or assessment may be more willing to allow interrogating, or repeated interrogating, if it is performed quickly and efficiently, and in a way that protects the person's privacy.

Figure 1:
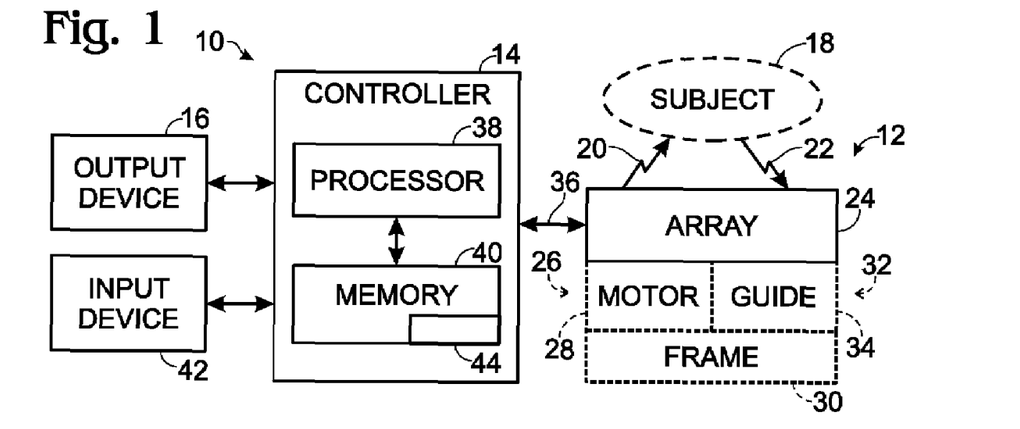
FIG. 1 is a general diagram showing an interrogation system.

Shown generally at 10 in FIG. 1 is an exemplary interrogation system. System 10 includes an interrogating apparatus 12, a controller 14, and in some systems, an output device 16. The system interrogates a subject 18 in the sense that the interrogating apparatus transmits electromagnetic radiation 20 toward the subject, and in response, the subject emits or reflects electromagnetic radiation 22 that is detected by the interrogating apparatus.

Subject 18 may include all that is presented for interrogation by an interrogation system, whether human, animal, or inanimate object. For example, if a person is presented for interrogation, subject 18 may include the entire person or a specific portion or portions of the person. Optionally, subject 18 may include one or more persons, animals, objects, or a combination of these.

System 10 may be adapted to interrogate subject 18 by irradiating it with electromagnetic radiation, and detecting the reflected radiation. Electromagnetic radiation may be selected from an appropriate frequency range, such as in the range of about 100 megahertz (MHz) to 2 terahertz (THz), generally referred to herein as millimeter-wave radiation. Satisfactory imaging, or the production of images from the detected radiation, may be obtained using electromagnetic radiation in the frequency range of one gigahertz (GHz) to about 300 GHz. Radiation in the range of about 5 GHz to about 110 GHz may also be used to produce acceptable images. Some imaging systems use radiation in the range of 24 GHz to 30 GHz. Such radiation may be either at a fixed frequency or over a range or set of frequencies using several modulation types, e.g. chirp, pseudorandom frequency hop, pulsed, frequency modulated continuous wave (FMCW), or continuous wave (CW).

Certain natural and synthetic fibers may be transparent or semi-transparent to radiation of such frequencies and wavelengths, permitting the detection and/or imaging of surfaces positioned beneath such materials. For example, when the subject of interrogation is a individual having portions of the body covered by clothing or other covering materials, such as a cast, wound dressings, bandages, or the like, information about portions of the subject's body covered by such materials can be obtained with system 10, as well as those portions that are not covered. Further, information relative to objects carried or supported by, or otherwise with a person beneath clothing can be provided with system 10 for metal and nonmetal object compositions, such as those used for prosthetic devices and the like.

Many variations of interrogating apparatus 12 are possible. For example, the interrogating apparatus may include an array 24 of one or more antenna units, each of which may further include a single antenna that transmits and receives radiation or a plurality of antennae that collectively transmit and receive radiation. Optionally, some embodiments may employ one or more antennae apparatus as described in U.S. Pat. No. 6,992,616 entitled "Millimeter-Wave Active Imaging System" the disclosure of which is herein incorporated by reference.

Depending on the interrogating apparatus, an imaging system may include an apparatus moving mechanism 26, represented by a motor 28, which may move interrogating apparatus 12 relative to a subject 18. Moving mechanism 26 may be mounted relative to a frame 30 for moving the apparatus along a path defined by a movement control mechanism 32, such as a guide 34, including any associated motor indexers, encoders or other controls, as appropriate. The moving mechanism may be any appropriate mechanism that moves the interrogating apparatus, and may include a servo motor, stepper motor, or other suitable device.

Interrogating apparatus 12 may be coupled to controller 14. As contemplated herein, the controller includes all structure and functions appropriate for generating, routing, processing, transmitting and receiving millimeter-wave signals to and from the interrogating apparatus. The controller, in this comprehensive sense, may include multiplexed switching among individual components of the interrogating apparatus, transmit and receive electronics, and mechanical, optical, electronic, and logic units. The controller thus may send to and receive from the interrogating apparatus signals 36, which may include appropriate signals, such as control signals and data signals.

Controller 14 may control operation of motor 28, and coordinate the operation of interrogation apparatus 12 with movement of the interrogation apparatus. Controller 14 may include hardware, software, firmware, or a combination of these, and may be included in a computer, computer server, or other microprocessor-based system capable of performing a sequence of logic operations. In addition, processing can be distributed with individual portions being implemented in separate system components.

Controller 14 may include a processor 38 and a memory 40. Components such as output devices, processors, memories and memory devices, and other components, may be wholly or partly co-resident in interrogation apparatus 12 or be wholly or partly located remotely from the interrogation apparatus.

Processor 38 may process data signals received from the interrogating apparatus. The processor thus may include hardware, software, firmware, or a combination of these, and may be included in a computer, computer server, or other microprocessor-based system capable of performing a sequence of logic operations. The processor may be any analog or digital computational device, or combination of devices, such as a computer(s), microprocessor(s), or other logic unit(s) adapted to control interrogating a subject and receiving data signals 36, and to generate a data set representative of at least a portion of the subject interrogated. A data set may include any data, whether processed, partially processed or unprocessed, or sub-sets of the data, such as: data for a portion of a subject; data that is manipulated in order to identify information corresponding to one or more given features of a subject; data that is manipulated in order to present, for viewing by an operator or by another processor, information corresponding to one or more given features of a subject; or measurements or other information relating to a subject that is derived from received signals. A data set may be output to one or more output devices 16 coupled to processor 38, such as a storage device, communication link, such as a network hub, another computer or server, a printer, or directly to a display device, such as a video monitor. Processor 38 may also be coupled to an input device 42 such as a keyboard, cursor controller, touch-screen display, another processor, a network, or other device or communication link.

In some embodiments, processor 38 may be coupled to memory 40 for storing data, such as one or more data sets generated by processor 38, or operating instructions, such as instructions for processing data. Memory 40 may be a single device or a combination of devices, and may be local to the processor or remote from it and accessible on a communication link or network. Operating instructions or code 44 may be stored on memory 40, and may be embodied as hardware, firmware, or software.

Data sets generated by the processor may thus be sent to and retrieved from memory 40 for storage. In some examples, a data set generated from interrogating a given subject may be retrieved for further processing, such as identifying information corresponding to a first and a second feature of the subject. In such examples, the processor may be configured to compare the information corresponding to the features, such as in analysis of opposing body portions by determining regions of symmetry or asymmetry between the body portions or otherwise comparing surface phenomena. In some examples, one or more data sets generated from interrogating a given subject at a given time may be stored in memory 38, and then may be compared with one or more data sets generated from interrogating the subject at a later time. In some examples, the processor may be configured to identify information in multiple data sets, each generated at a different time, but corresponding to the same given feature of the subject, and to compare the information corresponding to the feature at different times.

An interrogation system, such as that illustrated in FIG. 1, may be used for interrogating in a variety of applications, in which the controller may be configured to identify information in one or more data sets corresponding to one or more features of a subject. Examples of serial interrogating may include performing a series of interrogations of a subject at different times, generating a data set representative of the subject from each interrogation, and identifying information in each data set corresponding to a given feature of the subject, to allow a comparison of the information and analysis of development or changes in the given feature over time. Examples of non-serial interrogating may include interrogating a subject and generating a data set representative of the subject, and identifying information in the data set corresponding to two or more features of the subject, to allow a comparison and analysis of the information.

Figure 2:
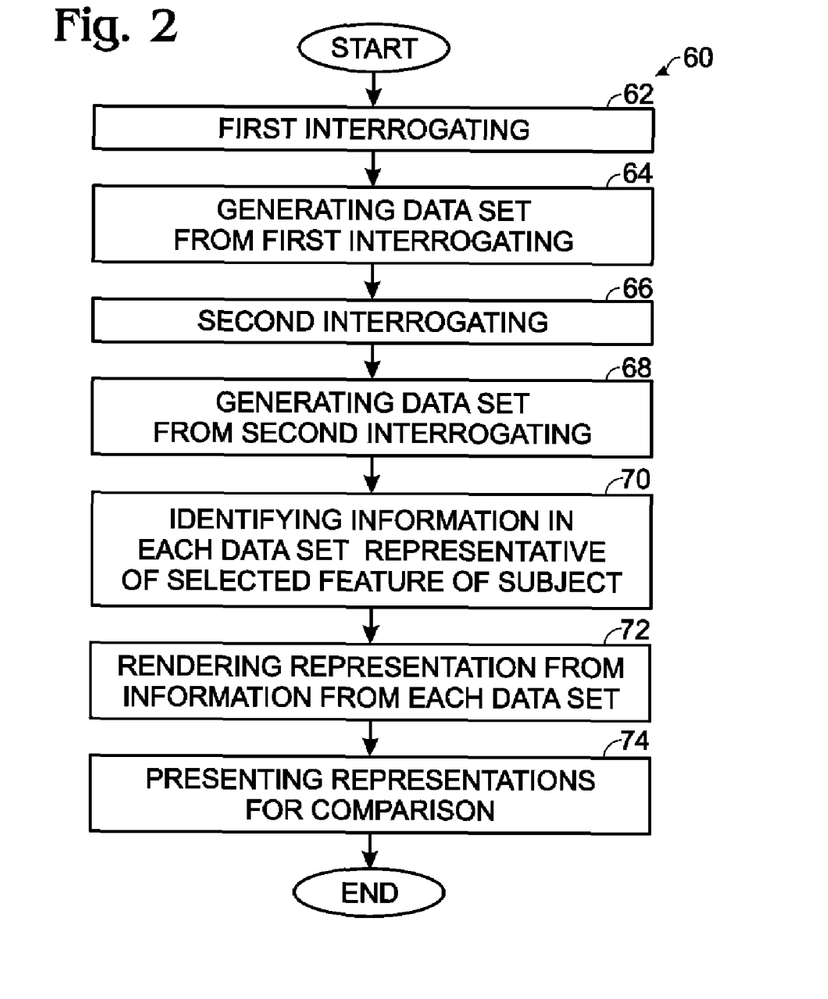
FIG. 2 is a flow chart illustrating actions involved in a serial interrogating method.
Figure 3:
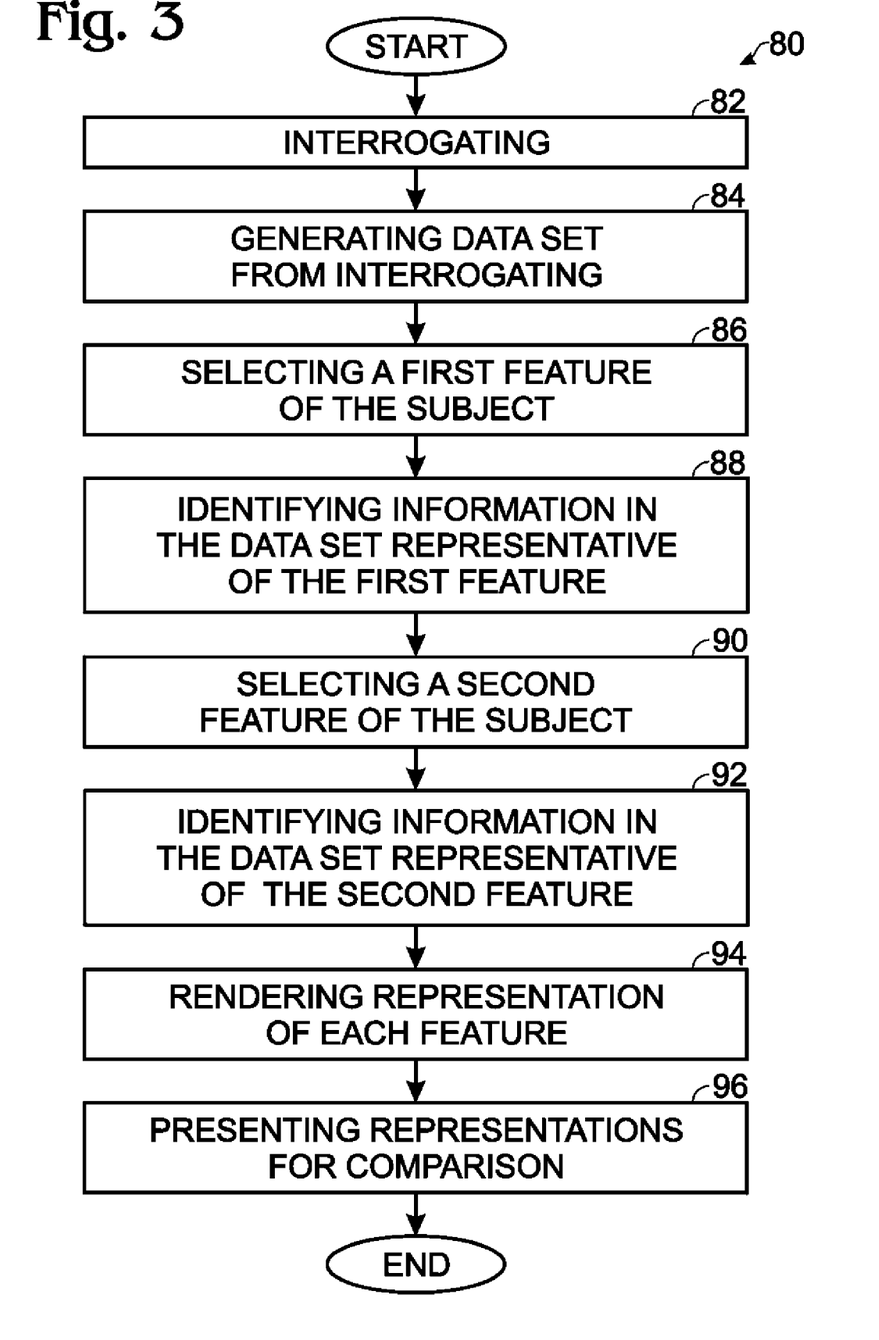
FIG. 3 is a flow chart illustrating actions involved in a non-serial interrogating method.

Following are various examples of interrogating methods that may be used with an interrogation system, such as system 10 illustrated in FIG. 1. FIG. 2 is a flow chart illustrating an exemplary set of actions in a serial interrogating method, and FIG. 3 is a flow chart illustrating an exemplary set of actions in a non-serial interrogating method.

Specifically, FIG. 2 shows a serial interrogating method 60, which begins in block 62 by first interrogating a given subject with electromagnetic radiation in a frequency range of about 100 MHz to about 2 THz, using, for example, imaging system 10. In block 64, a data set is generated from the first interrogating. The subject is interrogated a second time in block 66, and a data set from the second interrogating is generated in block 68.

The appropriate time between interrogations may depend upon the particular application for which the interrogation is being performed. For example, in applications in which a subject's physical development is monitored, such as when tracking a person's reaction to a dietary program, a physical therapy program, an exercise program, or the like, days, weeks, or even months between interrogations may be appropriate. In contrast, some applications may call for a series of interrogations separated by shorter intervals, such as real-time monitoring of a cosmetic surgery procedure, in which interrogating a subject every few minutes may be beneficial. Other applications may involve even shorter intervals, for example to simulate continuous monitoring, or much longer intervals. Also, as the frequency of interrogating a given subject will vary with the particular application, so too will the total number of interrogations.

After data sets from interrogations of a subject have been generated, information from each data set representative of a given feature of the subject is identified in block 70. The given feature may be selected by a user of the system, or by the system itself according to stored operating instructions. Likewise, operating instructions of the system may be configured to identify the appropriate information in each data set.

Figure 4:
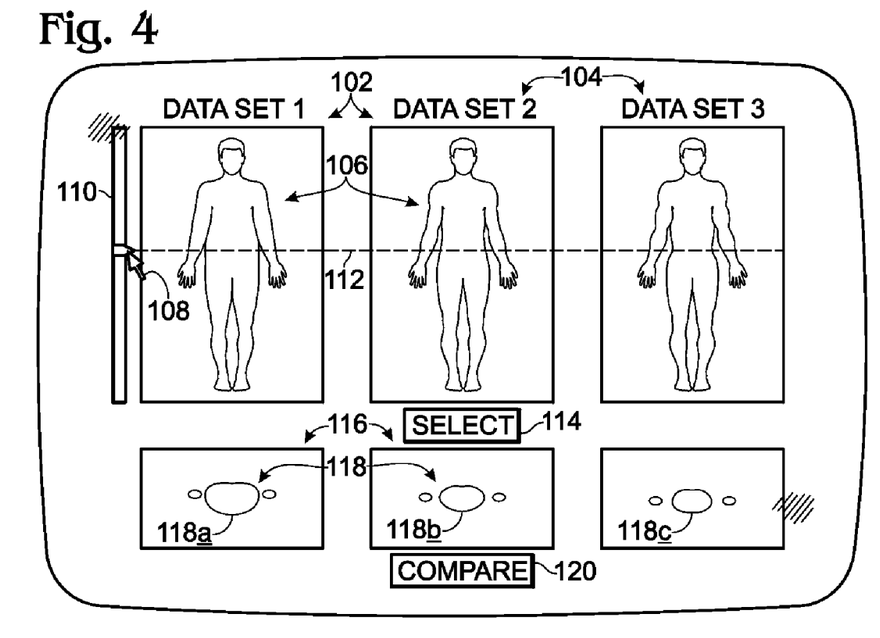
FIGS. 4, 5, and 6 show examples of displays presented by an interrogation system performing one or more actions of the method of FIG. 2.
Figure 5:
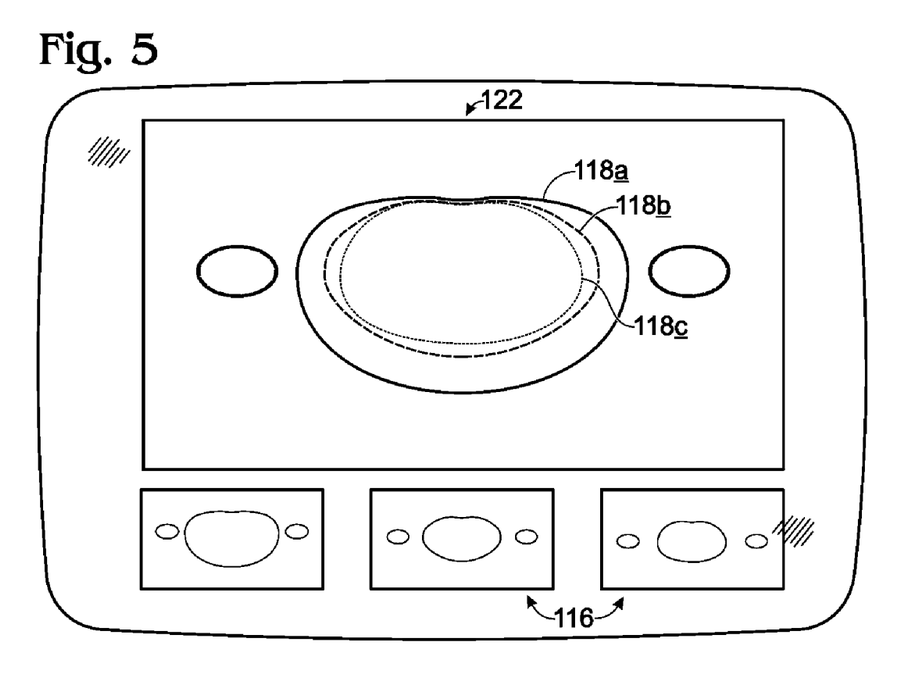
Figure 6:
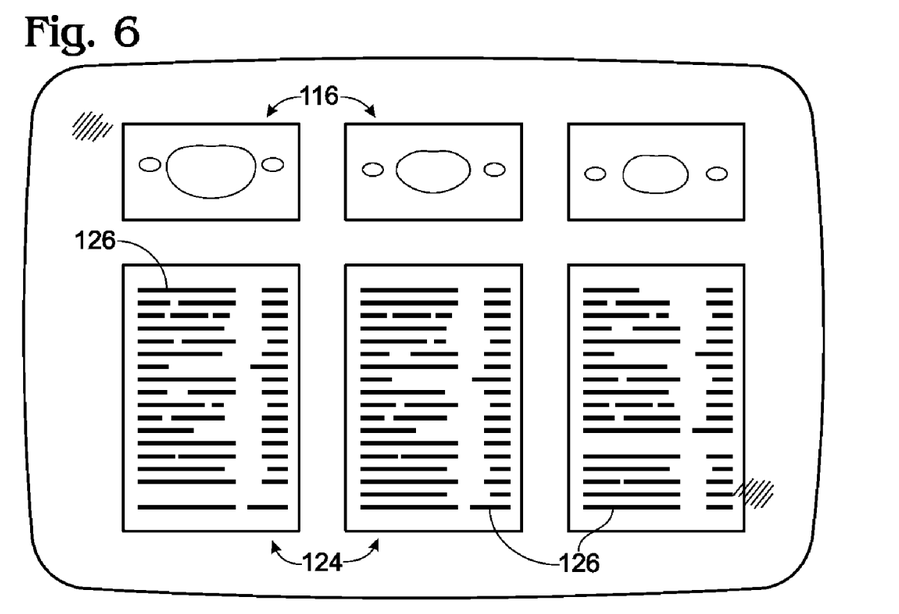

For example, FIGS. 4, 5, and 6 illustrate exemplary representations of displays that might appear on an output device of system 10, such as a monitor, while performing actions of serial interrogating method 60. In FIG. 4, a first set of images 102, each representative of information derived from a data set generated from an interrogation of a person, are presented chronologically or in some other desired order. The person in this example is an adult human male, and the particular application may be an assessment of the physical effects over time of a dietary or exercise program that the person is following. Captions 104 may present ancillary information about images 102, for example the time and date of the interrogation from which the data set corresponding to the image was generated. Each image 102 can be seen to include a full-body, frontal representation 106 of the interrogated person.

In the depicted example, a particular feature of the person, for example a cross-section of a selected body portion such as the person's waist, may be selected by moving a cursor 108 up or down a vertical scroll bar 110. Moving cursor 108 may correspondingly move a horizontal indicator line 112 over images 102. A "SELECT" button 114 may be activated once indicator line 112 has been placed to select the particular cross-section. Operating instructions of system 10 may then identify the information in each data set representative of the selected feature. Optionally, system 10 may select one or more features based on input or stored selection criteria or instructions. For example, the various data sets or images may be compared, and features that are sufficiently different may be identified.

Returning to FIG. 2, a representation of the information from each data set identified in block 70 may be rendered in block 72. Finally, in block 74, the representations may be presented for comparison.

In the example illustrated in FIG. 4, these steps may result in representations 106 of the person's body. The steps may also result in other representations, such as a second set of images 116, each of which can be seen to include a graphical, cross-sectional representation 118. Each cross-sectional representation 118 corresponds to the position of indicator line 112 over representations 106, and is a rendering of the information, or the cross-sectional data, representative of the selected cross-section. Individual representations 118a, 118b, and 118c may thus represent a cross-section of the person's waist at three different times.

Representations 118 may be presented in a variety of different ways. As can be seen in FIG. 4, representations 118 (or, more specifically, individual representations 118a, 118b, and 118c), when displayed concurrently and separately on a monitor, can be compared visually. A "COMPARE" button 120 may be activated to prompt system 10 to present the representations in another manner. Optionally, system 10 may be configured to execute a compare function automatically, for example, based on threshold differences or anomalies among the representations and/or in the information from which the representations are rendered.

For example, FIG. 5 depicts an exemplary display that may be presented when "COMPARE" button 120 is activated, which includes a composite image 122. Composite image 122 includes representations 118a, 118b, and 118c, presented concurrently and superimposed. In composite image 122, each representation 118 is visually distinguishable, and may be displayed in a different line style (as shown), in a different color, or in any manner in which a visual comparison may be facilitated. Optionally, composite image 122 may include presenting representations 118 individually in rapid sequence. Individual images 116 may optionally be displayed as shown, separate from, but associated with, composite image 122.

Alternatively or in addition to presenting representations for user comparison, system 10 may be configured to compare the representations and/or the information from the data sets from which the representations are rendered, and may produce output indicative of the comparison by presenting, for example, a composite graphical image highlighting portions for which a threshold difference exists, or alphanumeric data, or both. Optionally, the results of such a comparison may be further processed, stored in memory, provided as output to another output device, and so on. Moreover, comparison information may be rendered in the form of alphanumeric, graphical, or other information, and may include differences in feature information, proportions, ratios, trends, statistical data, or other relational information. Further, information rendered may relate to characteristics such as consistency or inconsistency of surface topography and may compare the relative proportion or characteristics of features directly or compare them to historical and/or standard proportions or characteristics.

System 10 optionally may render textual representations of the information identified. For example, FIG. 6 depicts another exemplary display that may be presented when "COMPARE" button 120 is activated, which includes a set of textual images 124, each of which may contain alphanumeric data 126 representative of the information corresponding to the selected feature. In the depicted example, such alphanumeric data may include numerical measurements of the person's waist, such as waist size (or circumference) or other surface measurements. Also, like the graphical representations of FIG. 5, the textual representations of FIG. 6 may be presented in a variety of manners conducive to comparison by a user. Optionally, the system may perform a comparison as described above and display information representative of the results of such a comparison. Individual images 116 may optionally be displayed as shown, separate from, but associated with, textual image sets 124.

The displays in FIGS. 4-6 depict examples of how different actions or steps of serial comparative interrogating method 60 may be displayed by interrogation system 10. Numerous variations are possible, which may be dependent upon factors such as the application in which method 60 is employed, the configuration of system 10, and so on. In an application in which effects of a physical therapy program on a patient are assessed, graphical representations rendered may include cross-sectional or other two-dimensional representations of the portion of the patient targeted by the physical therapy. In an application in which the postoperative results of cosmetic surgery are evaluated, representations may include topographical, volumetric, or other three-dimensional representations of the body portion modified by the surgery. Furthermore, information corresponding to the selected feature may be further processed, sent to another output device such as a printer, stored in memory, and so forth. In some applications, visual comparison or monitoring by a user may not be required nor desired.

Moreover, method 60 is an example of a serial interrogating method, in which a series of interrogations or "interrogating events," in which a given subject is interrogated and then a data set is generated from that interrogating, are performed. Other examples of serial interrogating methods may involve more or fewer steps than those indicated in FIG. 2. Applications involving more steps may include those in which more than two interrogations are performed, those in which more than one data set is generated from each interrogation, and so forth. In still other applications, the actions listed in method 60 may be performed in a different order. For example, unprocessed data from a series of interrogating events may be stored in a memory device of a system such as interrogation system 10, to be processed and/or further processed at various times during, or subsequent to the completion of, the series of interrogating events.

Some examples of an interrogating method may not involve multiple interrogating events. One example is illustrated in FIG. 3, which shows a non-serial interrogating method 80. Method 80 begins in block 82 by interrogating a given subject with electromagnetic radiation in a frequency range of about 100 MHz to about 2 THz, using, for example, imaging system 10. In block 84, a data set is generated from the interrogating.

After a data set from interrogating the subject has been generated, a first feature of the subject is selected in block 86, and information from the data set representative of the first feature of the subject is identified in block 88. A second feature of the subject is selected in block 90, and information from the data set representative of the second feature of the subject is identified in block 92. As in serial interrogating method 60, one or more given features may be selected by a user of the system. Optionally, components of the system, such as a processor, may select one or more features, and the information may be identified according to stored operating instructions.

Figure 7:
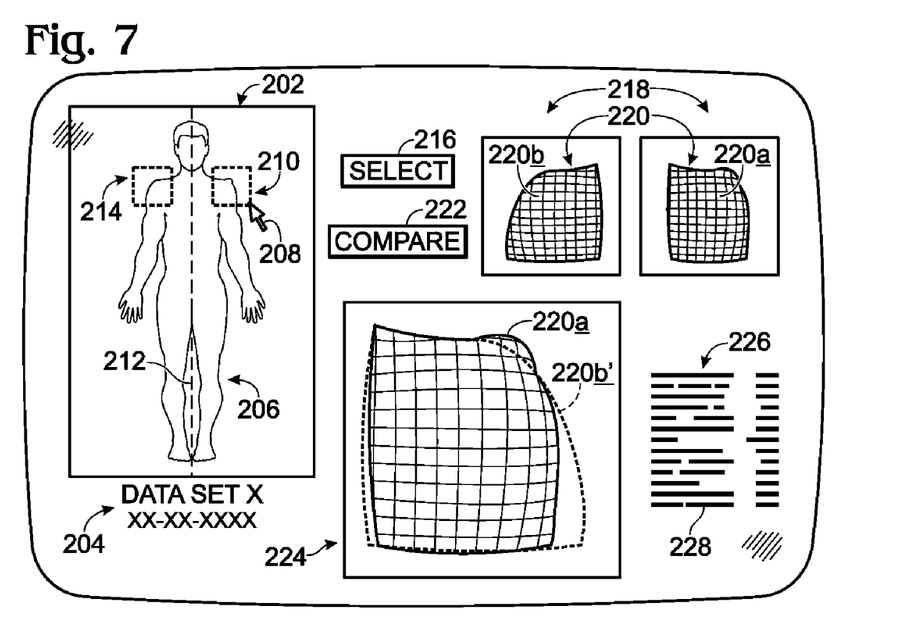
FIGS. 7 and 8 show examples of screens displays presented by an interrogation system performing one or more actions of the method of FIG. 3.
Figure 8:
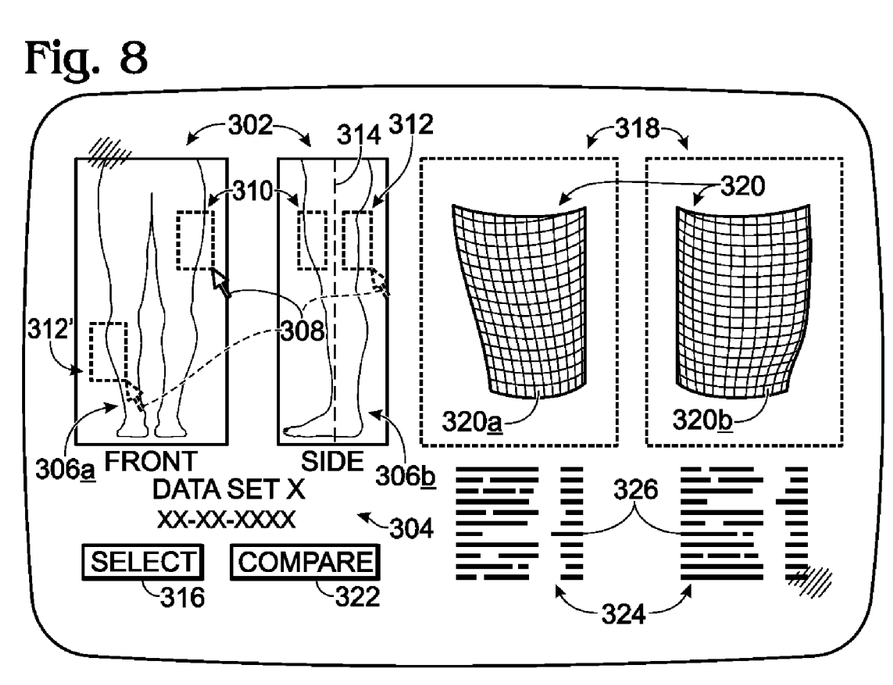

FIGS. 7 and 8 illustrate exemplary representations of displays that might appear on an output device of system 10, such as a monitor, while performing non-serial interrogating method 80. In FIG. 7, an image 202, representative of information derived from a data set generated from an interrogation of a person, is presented. The person in this example is an adult human male, and the particular application may be a medical diagnosis or physical assessment. Caption 204 may present ancillary information about image 202, for example the time and date of the interrogation from which the data set corresponding to the image was generated. Image 202 can be seen to include a full-body, frontal representation 206 of the interrogated person.

In the depicted example, a first feature of the subject, for example a body portion such as the person's left shoulder, may be selected by moving a cursor 208 to define a region 210. System 10 may include software or other operating instructions to select a second feature of the subject, for example an opposing body portion such as the person's right shoulder, by superimposing a plane of symmetry 212 on representation 206. Thus, as region 210 is defined with cursor 208, system 10 may define corresponding region 214 across plane of symmetry 212. Optionally, system 10 may select one or more features based on input or stored selection criteria or instructions. For example, the various data sets or images may be compared, and features that are sufficiently different may be identified.

A "SELECT" button 216 may be activated once region 210 and corresponding region 214 have been defined, to select the particular features. Operating instructions of system 10 may then identify the information in each data set representative of the selected feature.

As indicated in FIG. 3, representations of the information from the data set identified in blocks 88 and 92 (representative of the features selected in blocks 86 and 90, respectively), are rendered in block 94. In block 96, the representations are presented for comparison.

Returning to the example illustrated in FIG. 7, the results of these method steps are indicated by a set of images 218, each of which can be seen to include a topographical representation 220. Each topographical representation 220 corresponds to a selected feature of representation 206. Specifically, topographical representation 220a corresponds to region 210 (the person's left shoulder), and topographical representation 220b corresponds to region 214 (the person's right shoulder). Each topographical representation 220 is a rendering of the information, or the topographical data, representative of the selected feature.

Representations 220 may be presented in a variety of different ways. As can be seen in FIG. 7, representations 220a and 220b, when displayed concurrently and separately on a monitor, can be compared visually by a user.

Optionally, a "COMPARE" button 222 may be activated to prompt system 10 to present the representations in another manner. For example, when "COMPARE" button 222 is activated, a composite image 224 may be displayed, which may comprise representation 220a, presented concurrently and superimposed with a mirror image of representation 220b (indicated as 220b'). In composite image 224, each of representation 220a and 220b' is visually distinguishable, and may be displayed in a different line style (as shown), in a different color, or in any manner in which a visual comparison may be facilitated. Optionally, composite image 224 may comprise presenting representations 220a and 220b' individually in rapid sequence, or highlight differences between the two representations.

Alternatively, or in addition to graphical representations, system 10 may render textual representations of the information identified. For example, when "COMPARE" button 222 is activated, a textual representation 226 may be presented, which may contain alphanumeric data 228 representative of the information corresponding to the selected features. In the depicted example, such alphanumeric data may include surface measurements of the selected features. Also, like the topographical representations 220, the textual representation 226 may be presented in a variety of manners conducive to comparison by a user. For example, alphanumeric data may be rendered that provides differences, trends, statistical data, or other information related to the features identified.

As with method 60, system 10 may be configured to compare the representations and/or the information from which the representations are rendered, and present the results of the comparison to a user by presenting images and/or text on a monitor or providing other output indicative of the comparison. Optionally, the results of a comparison may be further processed, stored in memory, provided as output to another output device, and so on.

FIG. 7 thus may represent output presented to a user of system 10, wherein a first feature of the subject, a body portion (i.e., the person's right shoulder) is selected by a user, and a corresponding second feature, a contralateral body portion (i.e., the person's left shoulder), is selected by system 10 by projecting the user's selection across a superimposed plane of symmetry. The selections may be rendered into two-dimensional, three-dimensional, or topographical images or alphanumerical information and presented for comparison, and in examples wherein images are presented, a mirror image of the contralateral body portion may be superimposed over the image of the user-selected body portion. Optionally, system 10 may compare portions of one side of a person with contralateral portions, and produce images or other representations of those portions for which a threshold difference or asymmetry exists.

However, in other examples of method 80, body portions that are normally asymmetrical or non-contralateral may be selected for comparison. FIG. 8 illustrates another exemplary representation of a display that might appear on an output device of system 10, such as a monitor, while performing non-serial interrogating method 80. In FIG. 8, a set of images 302, representative of a data set generated from an interrogation of a person, is presented. The person in this example is an adult human male. Captions 304 may present ancillary information about images 302, which may include a front view 306a and a side view 306b of the lower body of the interrogated person.

In the depicted example, a first feature of the subject, for example a body portion such as the frontal aspect of the person's left thigh, may be selected by moving a cursor 308 to define a first region 310, or by automatic selection by system 10 based on selection criteria. A corresponding second feature, for example the dorsal aspect of the person's left thigh, may similarly be selected by moving cursor 308 to define a second region 312. Optionally, system 10 may include software or other operating instructions to select a second feature of the subject, for example by superimposing a plane 314 on representation 306b. Thus, as first region 310 is defined with cursor 308, system 10 may define second region 312 across plane 314. Plane 314 may be generated and placed by system 10 according to operating instructions, or by a user.

In other examples, a user may select both the first feature and the corresponding second feature, which may correspond in the sense that they are of the same person, or that they may share some other common characteristic. Thus, in one application, the features may be two body portions identified to assess the possibility of a skin graft from one to the other, by ascertaining, for example, whether surface characteristics of both body portions are similar. Thus, returning to FIG. 8, if the frontal aspect of the person's left thigh selected by a user as a first feature, defined as first region 310, a user may select a corresponding second feature, for example, the frontal aspect of the person's right calf, by defining a second region 312' using cursor 308.

A "SELECT" button 316 may be activated once first region 310 and second region 312 (or 312') have been identified, to input the selected features for processing. Operating instructions of system 10 may then identify the information in each data set representative of the selected feature. A set of images 318 may then be presented, each of which can be seen to include a topographical representation 320. Each topographical representation 320 corresponds to the selected features of the subject. Specifically, topographical representation 320a corresponds to first region 310 of the frontal aspect of the left thigh, and topographical representation 320b corresponds to second region 312 of the dorsal aspect of the left thigh. Each topographical representation 320 is a rendering of the information, or the topographical data, representative of the selected feature.

As with previous examples, representations 320 may be presented in a variety of different ways. When displayed concurrently and separately on a monitor, representations 320a and 320b can be compared visually. Optionally, a "COMPARE" button 322 may be activated to prompt system 10 to present the representations in another manner, for example, by rendering textual representations of the information identified, and/or by presenting graphical and/or textual representations of a comparison performed by system 10. As seen in FIG. 8, a set of textual representations 324 may contain alphanumeric data 326 presented in a tabular format. Of course, other methods of presenting the representations and/or comparison information are possible.

Although not necessarily shown in the figures, the methods disclosed, or actions thereof, may be performed in combination as desired for a particular application. Examples may include applications such as tracking a person's progress in response to a bodybuilding program to detect asymmetrical development, monitoring healing of body portions covered by bandages or casts, detecting change or imbalance over time in response to physical therapy, determining a normal topology for injured, diseased, or malformed (e.g. swollen) body parts, and other applications in which a given feature of a subject is identified at a given time and related with the same feature at different times and/or with one or more different features at the same or different times. The imaging in all such applications may be performed with the person clothed or unclothed, and with or without casts, wound dressings, or the like.

Although the present invention has been shown and described with reference to the foregoing operational principles and preferred embodiments, it will be apparent to those skilled in the art that various changes in form and detail may be made without departing from the spirit and scope of the invention. The present invention is intended to embrace all such alternatives, modifications and variances that fall within the scope of the appended claims.

While the inventions defined in the following claims have been particularly shown and described with reference to the foregoing examples, those skilled in the art will understand that many variations may be made therein without departing from the spirit and scope of the inventions. Other combinations and sub-combinations of features, functions, elements, actions and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present disclosure.

The foregoing embodiments are illustrative, and no single feature, element, or action is essential to all possible combinations that may be claimed in this or later applications. Where the claims recite "a" or "a first" element or the equivalent thereof, such claims should be understood to include one or more such elements, neither requiring nor excluding two or more such elements. Further, cardinal indicators, such as first, second, and third, for identified elements or actions are used to distinguish between the elements and actions, and do not indicate a required or limited number of such elements or actions, nor does it indicate a particular position or order of such elements or actions unless otherwise specifically stated.

We claim:

1. A method, comprising:
    interrogating a subject with electromagnetic radiation in a frequency range of about 100 MHz to about 2 THz;
    generating, from the interrogating, at least one data set representative of at least a portion of the subject;
    selecting from the at least one data set a first feature of the subject;
    identifying, from the at least one data set, first information relating to the first feature;
    in response to selecting the first feature, selecting from the at least one data set a second feature of the subject corresponding to the first feature; and
    identifying, from the at least one data set, second information relating to the selected second feature, the second information corresponding to the first information.

2. The method of claim 1, wherein the subject is a body.

3. The method of claim 2, wherein the first feature is a first body portion and the second feature is a contralateral second body portion.

4. The method of claim 2, further comprising:
    identifying a plane of symmetry along the body;
    wherein selecting a first feature includes selecting as the first feature a first body portion on one side of the plane of symmetry, and selecting a second feature includes selecting as the second feature an opposing second body portion on the other side of the plane of symmetry from the first body portion; and
    the method further comprising comparing the shape of the first body portion with the shape of the second body portion.

5. The method of claim 4, further comprising:
    determining whether the shape of the first body portion is symmetrical with the shape of the second body portion; and
    producing an output identifying the first and second body portions when the shapes of the first and second body portions are determined to be asymmetrical.

6. The method of claim 1, further comprising:
    rendering a representation of the information corresponding to each feature; and
    presenting the representations rendered.

7. The method of claim 6, wherein rendering a representation includes rendering one or more of a graphical representation and a textual representation.

8. The method of claim 7, wherein rendering a graphical representation includes rendering one or more of a two-dimensional representation, a cross-sectional representation, a three-dimensional representation, and a topographic representation.

9. The method of claim 8, wherein the first feature is a first body portion and the second feature is a contralateral second body portion, wherein rendering a graphical representation of the information corresponding to each feature includes rendering a mirror image of one of the features, and wherein presenting the representations rendered includes superimposing the graphical representations.

10. The method of claim 7, wherein rendering a textual representation includes rendering an alphanumeric representation.

11. A computer program product comprising:
    computer code arranged, when executed by a processor, to perform the method of claim 1; and
    a computer readable medium that stores the computer code.

12. A computer readable storage medium with a computer program thereon, comprising at least one code segment that, when executed by a processor, performs the method of claim 1.

13. The method of claim 1, further comprising
    identifying, from each data set, information corresponding to the first feature of the subject,
    wherein interrogating a subject includes first interrogating a given subject at a first time with electromagnetic radiation in a frequency range of about 100 MHz to about 2 THz and second interrogating the given subject at a second time different than the first time with electromagnetic radiation in a frequency range of about 100 MHz to about 2 THz; and
    wherein generating includes generating a data set representative of the given subject from the first interrogating and from the second interrogating.

14. A system comprising:
    means for interrogating a subject with electromagnetic radiation in a frequency range of about 100 MHz to about 2 THz;
    means for generating, from the interrogating, at least one data set representative of at least a portion of the subject;
    means for selecting from the at least one data set a first feature of the subject;
    means for identifying, from the at least one data set, first information relating to the first feature;
    means for selecting, in response to selecting the first feature and from the at least one data set, a second feature of the subject corresponding to the first feature, and
    means for identifying, from the at least one data set, second information relating to the selected second feature, the second information corresponding to the first information.

15. The system of claim 14, further comprising:
    means for presenting the information identified.

16. The system of claim 14, wherein the subject is a body, and wherein the first feature is a first body portion and the second feature is a contralateral second body portion.

* * * * *